(12) United States Patent
Evans et al.

(10) Patent No.: US 11,177,897 B2
(45) Date of Patent: Nov. 16, 2021

(54) DISTRIBUTED PRECISION TIME PROTOCOL TRANSPARENT CLOCK

(71) Applicant: Ciena Corporation, Hanover, MD (US)

(72) Inventors: David James Evans, Ottawa (CA); Daniel Claude Perras, Ottawa (CA)

(73) Assignee: Ciena Corporation, Hanover, MD (US)

( * ) Notice: Subject to any disclaimer, the term of this patent is extended or adjusted under 35 U.S.C. 154(b) by 61 days.

(21) Appl. No.: 16/797,075

(22) Filed: Feb. 21, 2020

(65) Prior Publication Data
US 2021/0266085 A1    Aug. 26, 2021

(51) Int. Cl.
    *H04J 3/06* (2006.01)

(52) U.S. Cl.
    CPC .......... *H04J 3/0673* (2013.01); *H04J 3/0667* (2013.01)

(58) Field of Classification Search
    CPC .......... H04J 3/06; H04J 3/0635; H04J 3/0638; H04J 3/0658; H04J 3/0661; H04J 3/0667; H04J 3/067; H04J 3/0673; H04J 3/0682; H04J 3/0685
    See application file for complete search history.

(56) References Cited

U.S. PATENT DOCUMENTS

| | | | |
|---|---|---|---|
| 8,416,763 B1 * | 4/2013 | Montini | H04J 3/0667 370/350 |
| 8,630,315 B2 | 1/2014 | Rivaud et al. | |
| 8,718,482 B1 * | 5/2014 | Roberts | H04L 7/0075 398/161 |
| 8,953,948 B2 | 2/2015 | Meng et al. | |
| 9,432,144 B2 | 8/2016 | Gareau et al. | |
| 10,313,103 B1 | 6/2019 | Perras et al. | |
| 10,396,972 B1 | 8/2019 | Gareau et al. | |
| 2012/0027414 A1 * | 2/2012 | Wei | H04J 3/0655 398/100 |
| 2012/0275501 A1 * | 11/2012 | Rotenstein | H04J 3/0667 375/220 |
| 2013/0155945 A1 * | 6/2013 | Chen | H04J 3/0661 370/328 |

(Continued)

OTHER PUBLICATIONS

Telecommunication Standardization Sector of ITU, ITU-T G.8275.1/Y.1369.1, Precision time protocol telecom profile for phase/time synchronization with full timing support from the network, Jun. 2016, pp. 1-56.

*Primary Examiner* — Kevin D Mew
(74) *Attorney, Agent, or Firm* — Clements Bernard Baratta; Lawrence A. Baratta, Jr.; Christopher L. Bernard (57) ABSTRACT

A distributed Precision Time Protocol (PTP) Transparent Clock (TC) provides a TC function based on overall residence time in a network at a server layer. That is, the server layer operates as a distributed TC for a corresponding client layer. A transport network includes a first node connected to a first client device; and a second node connected to a second client device over a server layer, wherein the first client device communicates to the second client device via a client layer, wherein the first node and the second node are synchronized to one another, and wherein the first node and the second node are configured to implement a distributed transparent clock on a PTP packet at the client layer, the distributed transparent clock includes a correction field in the PTP packet based on a residence time in the transport network at the server layer.

20 Claims, 5 Drawing Sheets

(56) References Cited

U.S. PATENT DOCUMENTS

| | | | |
|---|---|---|---|
| 2014/0036936 A1* | 2/2014 | Bui | H04J 3/0638 |
| | | | 370/503 |
| 2014/0362770 A1* | 12/2014 | Jonsson | H04W 80/02 |
| | | | 370/328 |
| 2014/0362872 A1* | 12/2014 | Grenabo | H04J 3/0667 |
| | | | 370/507 |
| 2015/0071309 A1* | 3/2015 | Aweya | H04J 3/0682 |
| | | | 370/503 |
| 2015/0117471 A1* | 4/2015 | Mizrahi | H04J 3/0667 |
| | | | 370/512 |
| 2015/0139663 A1* | 5/2015 | Lanzone | H04L 7/0075 |
| | | | 398/154 |
| 2015/0358702 A1* | 12/2015 | Ott | H04Q 11/08 |
| | | | 370/377 |
| 2016/0170440 A1* | 6/2016 | Aweya | H04L 69/28 |
| | | | 713/503 |
| 2017/0063481 A1* | 3/2017 | Pauwels | H04L 12/2878 |
| 2017/0093757 A1* | 3/2017 | Gareau | H04L 43/0864 |
| 2017/0150464 A1* | 5/2017 | Kazehaya | H04B 7/269 |
| 2017/0237512 A1* | 8/2017 | Galea | H04J 3/0667 |
| | | | 370/350 |
| 2018/0375800 A1 | 12/2018 | Gareau et al. | |
| 2019/0036804 A1* | 1/2019 | Mihelic | H04L 27/2657 |
| 2019/0081720 A1* | 3/2019 | Barry | H04J 3/0667 |
| 2020/0028585 A1 | 1/2020 | Abdullah et al. | |
| 2021/0288736 A1* | 9/2021 | Guignard | H04J 3/0667 |

\* cited by examiner

DISTRIBUTED PRECISION TIME PROTOCOL TRANSPARENT CLOCK

FIELD OF THE DISCLOSURE

The present disclosure generally relates to networking. More particularly, the present disclosure relates to systems and methods for a distributed Precision Time Protocol (PTP) Transparent Clock (TC).

BACKGROUND OF THE DISCLOSURE

Precision Time Protocol (PTP) is a protocol used to synchronize clocks throughout a network. For example, it achieves clock accuracy in the sub-microsecond range, making it suitable for measurement and control systems. PTP was originally defined in the IEEE 1588-2002 standard, officially entitled "Standard for a Precision Clock Synchronization Protocol for Networked Measurement and Control Systems" and published in 2002. In 2008, IEEE 1588-2008 was released as a revised standard; also known as PTP Version 2, it improves accuracy, precision, and robustness but is not backward compatible with the original 2002 version. Further, another update, referred to as PTP Version 2.1, was introduced in 2019, namely IEEE 1588-2019. IEEE 1588-2002, IEEE 1588-2008, and IEEE 1588-2019 are incorporated herein by reference. PTP generally includes messages between nodes for clock synchronization therebetween. A Transparent Clock (TC) modifies PTP messages as they pass through a device. For example, timestamps in the messages are corrected for time spent traversing the network equipment. This scheme improves distribution accuracy by compensating for delivery variability across the network.

Packet networks introduce Packet Delay Variation (PDV). Since the PTP protocol uses the departure and arrival time of PTP packets to communicate time information between nodes, PDV can be thought of as noise on this timing information. Thus, PDV affects the accuracy of synchronization that can be achieved with the PTP protocol. In high accuracy applications, PTP services require network elements to implement a Boundary Clock (BC) function or Transparent Clock (TC) function to mitigate the error due to this PDV. This also is true in transport networks (e.g., Layer 0 and Layer 1). In a transport network, a client layer can include a packet layer and a server layer can include a Time Division Multiplexing (TDM) layer, such as, for example Optical Transport Network (OTN) and the like. The typical solution for implementing a BC or TC in transport equipment is to terminate the IEEE 1588 protocol at the client interface and carry IEEE 1588 in the overhead of the server layer.

BC and TC functions require insertion and extraction or modification of PTP packets, which introduces additional data path latency (which is especially undesirable for 5G front-haul or edge compute applications where latency should be minimized) and increases design complexity because they require queuing, discard, scheduling and classification functions.

Some phase synchronization profiles such as ITU-T G.8275.1, "Precision time protocol telecom profile for phase/time synchronization with full timing support from the network," (06/16), the contents of which are incorporated herein by reference, require that all nodes in a network terminate the IEEE 1588 protocol at the physical interface. This requires the transport node to synchronize to one of its client interfaces in order to distribute synchronization on its server layer interface. In these applications, it is complicated for the transport equipment to support multiple independent client clock domains.

Many operators design their networks such that there is some separation between the packet network and the transport network. In some cases, the packet network and transport networks are managed by different departments in the organization. Therefore, there can be a desire for the transport network to simply transport a synchronization signal, rather than participate in the client's synchronization network. This is particularly true of a "carrier's carrier." These types of operators do not want to synchronize their transport equipment to their customer's client signals.

BRIEF SUMMARY OF THE DISCLOSURE

The present disclosure relates to systems and methods for a distributed Precision Time Protocol (PTP) Transparent Clock (TC). A Transparent Clock is a switch or router device which measures the delay, or residence time, of PTP packets which pass through it and communicates this using the correction field of the PTP header. PTP slave clocks attempting to recover an accurate clock from a PTP master clock when connected though a Transparent Clocks may use the information in the correction field to compensate for the variable queueing and processing delays introduced by the switching or routing functions. The Transparent Clock function significantly improves the accuracy of clock recovery by the slave clock from the master clock, especially when the PDV between the master and slave is large and/or the delay in each direction is asymmetrical. The present disclosure extends the TC function, which currently is implemented within a single device, and distributes it across a wider area between network elements connected via optical, electrical, or wireless communication channels. That is, the TC extends between the ingress and egress client interfaces of different network elements.

In an embodiment, a distributed transparent clock method includes, in a network element, receiving a Precision Time Protocol (PTP) packet in a client layer for transport over a network at a server layer; transmitting the PTP packet over the server layer; and determining a correction field in the PTP packet based on a residence time in the network between an ingress client interface and an egress client interface. The network element can be at a first network element in the network, and the distributed transparent clock method can further include receiving the PTP packet from a second network element in the network, wherein the first network element and the second network element are synchronized to one another, the ingress client interface is in the second network element, and the egress client interface is in the first network element. The distributed transparent clock method can further include performing synchronization of nodes in the server layer, for the determining, wherein the synchronization in the server layer is separate from synchronization associated with the PTP packet in the client layer.

The residence time in the network can include elapsed time between an arrival time of a PTP packet at the ingress client interface of one network element and a departure time of the PTP packet from the egress client interface at a different network element. The determining can include an ingress node in the network subtracting a first time in the correction field, followed by an egress node in the network adding a second time in the correction field, where the first time is a current time at the ingress node when the receiving and the second time is a current time at the egress node when transmitting over the client layer. The determining can include an ingress node marking an arrival time at the receiving in a reserved field of the PTP packet, followed by an egress node updating the correction field by adding a difference between a current time and the arrival time in the reserved field. The determining can include an ingress node appending a Type-Length-Value (TLV) to the PTP packet which indicates an arrival time, followed an egress node updating the correction field by adding a difference between a current time and the arrival time in the TLV.

In another embodiment, a distributed transparent clock apparatus, in a first node in a network, includes client layer components configured to interface a device that operates at a client layer; and server layer components configured to connect to a network that operates at a server layer, wherein the server layer components are configured to implement a synchronization instance with a second node in the network, and wherein the client layer components are configured to implement a distributed transparent clock on a Precision Time Protocol (PTP) packet at the client layer, the distributed transparent clock includes a correction field in the PTP packet based on a residence time in the network between an ingress client interface and an egress client interface. The correction field can be set based on the synchronization instance with the second node. The synchronization instance in the server layer can be separate from synchronization associated with the PTP packet in the client layer.

The residence time in the network can include elapsed time between an arrival time of a PTP packet at the ingress client interface of one network element and a departure time of the PTP packet from the egress client interface at a different network element. The correction field can be set by the first node subtracting a first time in the correction field, followed by the second node adding a second time in the correction field, where the first time is a current time at the first node when the PTP packet is received and the second time is a current time at the second node when transmitted over the client layer. The correction field can be set by the first node marking an arrival time in a reserved field of the PTP packet, followed by the second node updating the correction field by adding a difference between a current time and the arrival time in the reserved field. The correction field can be set by the first node appending a Type-Length-Value (TLV) to the PTP packet which indicates an arrival time, followed the second node updating the correction field by adding a difference between a current time and the arrival time in the TLV.

In a further embodiment, a transport network includes a first node connected to a first client device; and a second node connected to a second client device via one or more network links over a server layer, wherein the first client device communicates to the second client device via a client layer, wherein the first node and the second node are synchronized to one another, and wherein the first node and the second node are configured to implement a distributed transparent clock on a Precision Time Protocol (PTP) packet at the client layer, the distributed transparent clock includes a correction field in the PTP packet based on a residence time in the transport network between an ingress client interface and an egress client interface. The first node and the second node can be synchronized separate from synchronization associated with the PTP packet in the client layer.

The residence time in the network can include elapsed time between an arrival time of a PTP packet at the ingress client interface of one network element and a departure time of the PTP packet from the egress client interface at a different network element. The correction field can be set by the first node subtracting a first time in the correction field, followed by the second node adding a second time in the correction field, where the first time is a current time at the first node when the PTP packet is received and the second time is a current time at the second node when transmitted over the client layer. The correction field can be set by the first node marking an arrival time in a reserved field of the PTP packet, followed by the second node updating the correction field by adding a difference between a current time and the arrival time in the reserved field. The correction field can be set by the first node appending a Type-Length-Value (TLV) to the PTP packet which indicates an arrival time, followed the second node updating the correction field by adding a difference between a current time and the arrival time in the TLV.

BRIEF DESCRIPTION OF THE DRAWINGS

The present disclosure is illustrated and described herein with reference to the various drawings, in which like reference numbers are used to denote like system components/method steps, as appropriate, and in which:

FIG. 5 is a block diagram of a processing device, which can form a controller for the network element of FIG. 4, or the like.

DETAILED DESCRIPTION OF THE DISCLOSURE

Again, the present disclosure relates to systems and methods for a distributed Precision Time Protocol (PTP) Transparent Clock (TC). A Transparent Clock is a switch or router device which measures the delay, or residence time, of PTP packets which pass through it and communicates this using the correction field of the PTP header. PTP slave clocks attempting to recover an accurate clock from a PTP master clock when connected though a Transparent Clock may use the information in the correction field to compensate for the variable queueing and processing delays introduced by the switching or routing functions. The Transparent Clock function significantly improves the accuracy of clock recovery by the slave clock from the master clock, especially when the PDV between the master and slave is large and/or the delay in each direction is asymmetrical. The present disclosure extends the TC function, which currently is implemented within a single device, and distributes it across a wider area between network elements connected via optical, electrical, or wireless communication channels. That is, the TC extends between the ingress and egress client interfaces of different network elements.

The present disclosure enables a simplified solution for distributing phase/time synchronization across a transport network (server layer). It also allows multiple clock domains (e.g., the synchronization signals of multiple customers) to be transported by a carrier over the same transport infrastructure. This is a particular advantage for operators offering fronthaul/backhaul services for mobile networks because precise network synchronization is required in these applications. This disclosure allows these operators to transport the synchronization signals of their customers transparently.

Precision Time Protocol (PTP)

The Precision Time Protocol (PTP), specified in the IEEE 1588 standard, is the latest in packet-based timing technology. PTP overcomes the Ethernet Network Time Protocol (NTP) accuracy issues, providing an unprecedented accuracy in the nanosecond range. The effects of network latency are greatly reduced by using techniques such as hardware based timestamps and deployment of BCs and TCs within the network.

The IEEE 1588 standard makes several assumptions about the network being used (e.g., multicast support), but the key assumptions that affect clock accuracy are:

1) The transmission delays are almost constant over time (or at least change slowly);
2) The transmission delays are symmetrical between master and slave (i.e., time to travel from master to slave is the same as from slave to master).

When carried over a Carrier Ethernet Network (CEN), IEEE 1588 requires a dedicated Class of Service (CoS) or even a dedicated Ethernet Virtual Circuit (EVC) with stringent requirements on Frame Loss Ratio, Frame Delay and Inter-frame Delay Variation to achieve precise synchronization between master and slave clocks.

Figure 1:
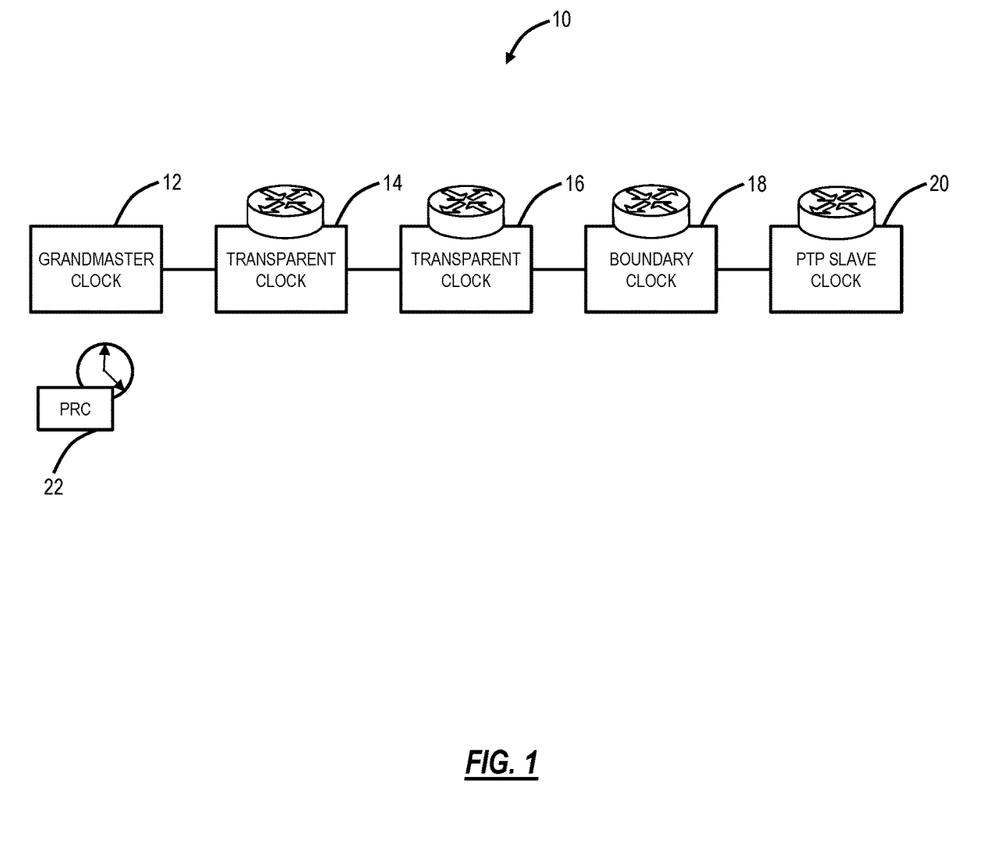
FIG. 1 is a network diagram of an example network utilizing Precision Time Protocol (PTP)

FIG. 1 is a network diagram of an example network 10 utilizing PTP. The network 10 includes a grandmaster clock 12, transparent clocks 14, 16, a boundary clock 18, and a PTP slave clock 20. The grandmaster clock 12 is a the ultimate source of time in the network 10 and can be connected to a high-precision time source, namely a Primary Reference Clock (PRC) 22, such as a Global Positioning Satellite (GPS) reference, an atomic clock, etc.

The boundary clock functionality can be implemented in a switch/router along the path of the network 10. IEEE 1588 boundary clocks are an effective way to reduce packet delay variation. A boundary clock 18 runs the PTP protocol and is synchronized to the master clock, namely the grandmaster clock 12. The boundary clock 18, in turn, acts as a master clock to all downstream slaves within the same network 10, such as the PTP slave clock 20.

The boundary clock 18 terminates all PTP messages for the PTP domain that it operates in. The Best Master Clock Algorithm (BMCA) is used by the boundary clock 18 to select the best clock visible to the boundary clock from one of its ports. The chosen port is placed in the slave state, the boundary clocks synchronizes to the selected grandmaster clock 12, and all other ports of the boundary clock 18 are placed in either the master or passive state according to the port state decision algorithm.

Transparent clocks provide an alternate way to reduce the PDV experienced by PTP packets in a network. Rather than terminating PTP messages as boundary clocks 18 do, transparent clocks 14, 16 modify the correction field of PTP event messages to include the delay the message experienced through the transparent clock There are two types of transparent clocks 14, 16: end-to-end and peer-to-peer. End-to-end transparent clocks forward PTP event messages but modify the messages to include the residence time for the message to traverse the transparent clock. The residence times are accumulated in the correction field of the PTP event message or the associated follow-up message. Peer-to-peer transparent clocks measure the local link delays using the peer delay mechanism, in addition to the residence time. The computation of link delay (peer delay mechanism) is based on an exchange of Pdelay_Req, Pdelay_Resp, and possibly Pdelay_Resp_Follow_Up messages with the link peer. Peer-to-peer and end-to-end transparent clocks cannot be mixed on the same communication path. Peer-to-peer transparent clocks can allow for faster reconfiguration after network topology changes.

In summary, the transparent clock 14, 16 is a PTP enhanced switch that modifies the correction field within the PTP messages to account for the transit delay within the individual switch itself, thus leading to more accurate synchronization between the slave and master clocks.

PTP operation is based upon the transfer of short messages to determine system properties and to convey time information. A delay measurement technique is used to determine path delay, which is then used for the adjustment of local clocks. IEEE 1588 uses an algorithm—the Best Master Clock Algorithm (BMCA)—in order to determine which clock is of the highest quality within the network and to create a master/slave hierarchy.

In the network 10, the boundary clock synchronizes to the grandmaster clock 12 and the PTP slave clock 20 synchronizes to the boundary clock 12. As a result, the time at the PTP slave clock is traceable to the grandmaster clock. The BMCA is then run continuously to adjust for changes in network configuration quickly. So, if the grandmaster clock is removed from the network or is determined by the BMCA to no longer have the highest quality clock, the algorithm determines the new best master clock for the boundary clock and PTP slave clock to synchronize to.

Distributed Transparent Clock

As described herein, IEEE 1588 defines the transparent clock 14, 16 in the context of a single network element. Again, the transparent clock 14, 16 is a switch or router device which measures the delay, or residence time, of PTP packets which pass through it and communicates it in the correction field of the packet. The PTP slave clock 20 attempting to recover an accurate clock from grandmaster clock 12 when connected through the transparent clocks 14, 16 may use the correction field to compensate for the variable queueing and processing delays introduced by the switching or routing functions. The transparent clock 14, 16 function significantly improves the accuracy of clock recovery by the PTP slave clock 20 from the grandmaster clock 12, especially when the PDV between the grandmaster clock 12 and the PTP slave clock 20 is large and/or the residence time in each direction is asymmetrical.

Figure 2:
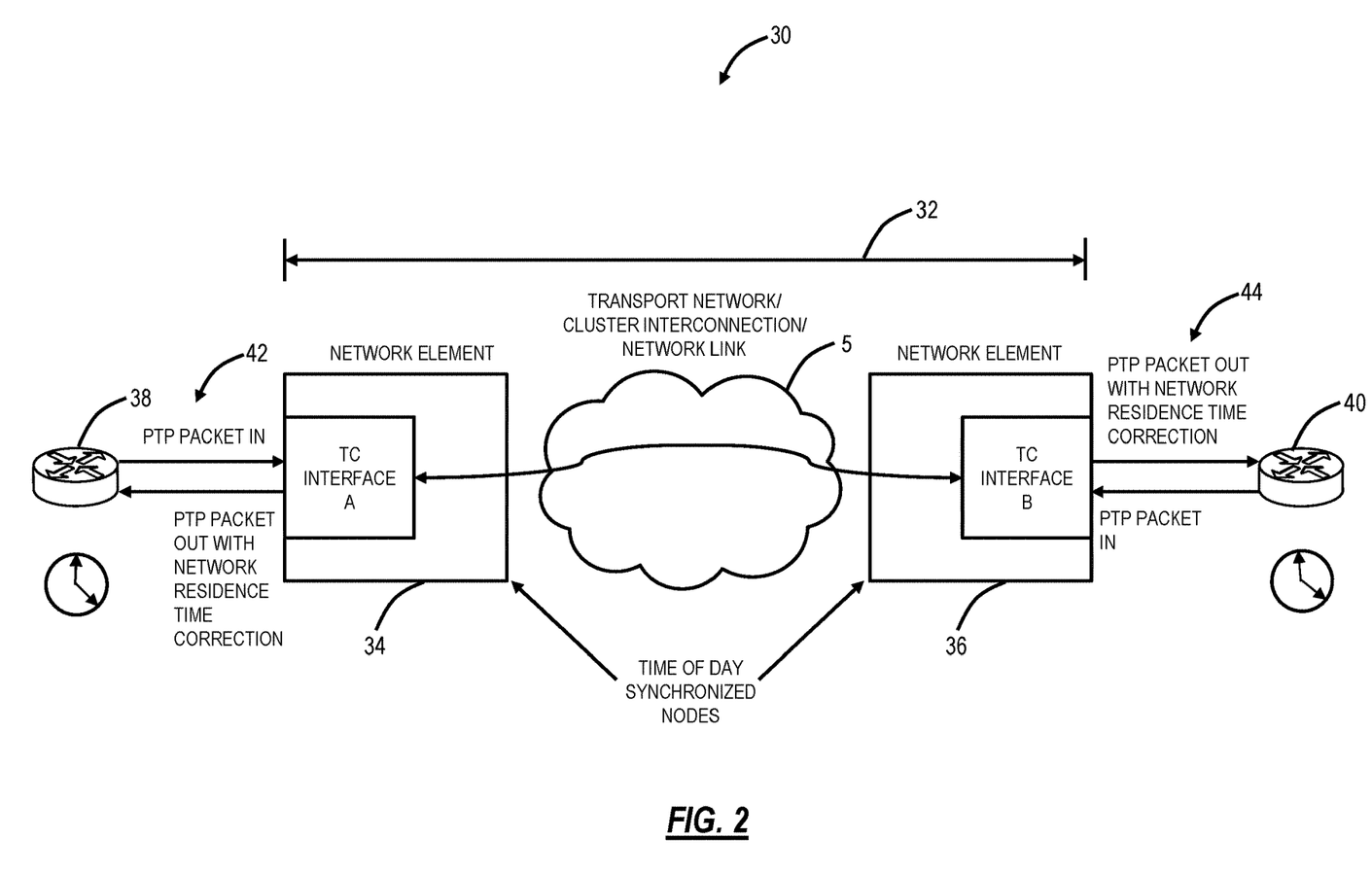
FIG. 2 is a block diagram of a network with a distributed transparent clock between network elements in a transport network, a cluster interconnection, or interconnected by a network link.

The present disclosure extends the TC function and distributes it across a wider area between network elements connected via optical, electrical, and/or wireless communication channels. FIG. 2 is a block diagram of a network 30 with a distributed transparent clock 32 between network elements 34, 36 in a network 5 such as a transport network, a cluster interconnection, or interconnected by a network link. Switches 38, 40 are interconnected to one another via the network elements 34, 36 and through the network 5 In the present disclosure, the entire network 5 and the network elements 34, 36 appear as a single distributed transparent clock to the switches 38, 40.

The network elements 34, 36 include client interfaces A, B, respectively, which interface to the switches 38, 40, respectively. The network elements 34, 36 map client signals between the switches 38, 40, transparently, in a server layer for transport across the network 5. That is, the switches 38, 40 operate at a client layer, e.g., Ethernet, and the network elements 34, 36 operate at a server layer, such as, for example, Optical Transport Network (OTN), Flexible Ethernet (FlexE), Ethernet, wireless, etc. Also, the network elements 34, 36 could actually be modules rather than network nodes. For example, the network elements 34, 36 could be broadband transponders, interface modules, modems, etc., such as in packet-optical transport systems. Also, the network elements 34, 36 could be pluggable optical modules, such as Digital Coherent Optics (DCO) and the like.

In an embodiment, IEEE 1588 can be used to synchronize time across the network elements 34, 36, and the network 5. This instance of PTP is at the server layer and separate from any instance of PTP running in the client layer. Of course, other techniques for synchronizing the network elements 34, 36 in the network 5 are also contemplated. For example, each network element 34, 36 may be synchronized to a GPS receiver that is traceable the Coordinated Universal Time (UTC).

Once synchronized, the network elements 34, 36 can act together to perform a TC function (i.e., a distributed TC). IEEE 1588 event messages (e.g., PTP packets 42, 44) in the client layer are timestamped at the ingress and egress of the transport network 5. The ingress and egress timestamps are used to calculate a residence time, which is added to the correction field of the event messages for the TC function. In the present disclosure, the residence time includes an overall time in the network, i.e., an elapsed time between an arrival time of a PTP packet at the ingress client interface of one network element and a departure time of the PTP packet from the egress client interface at a different network element.

Figure 3:
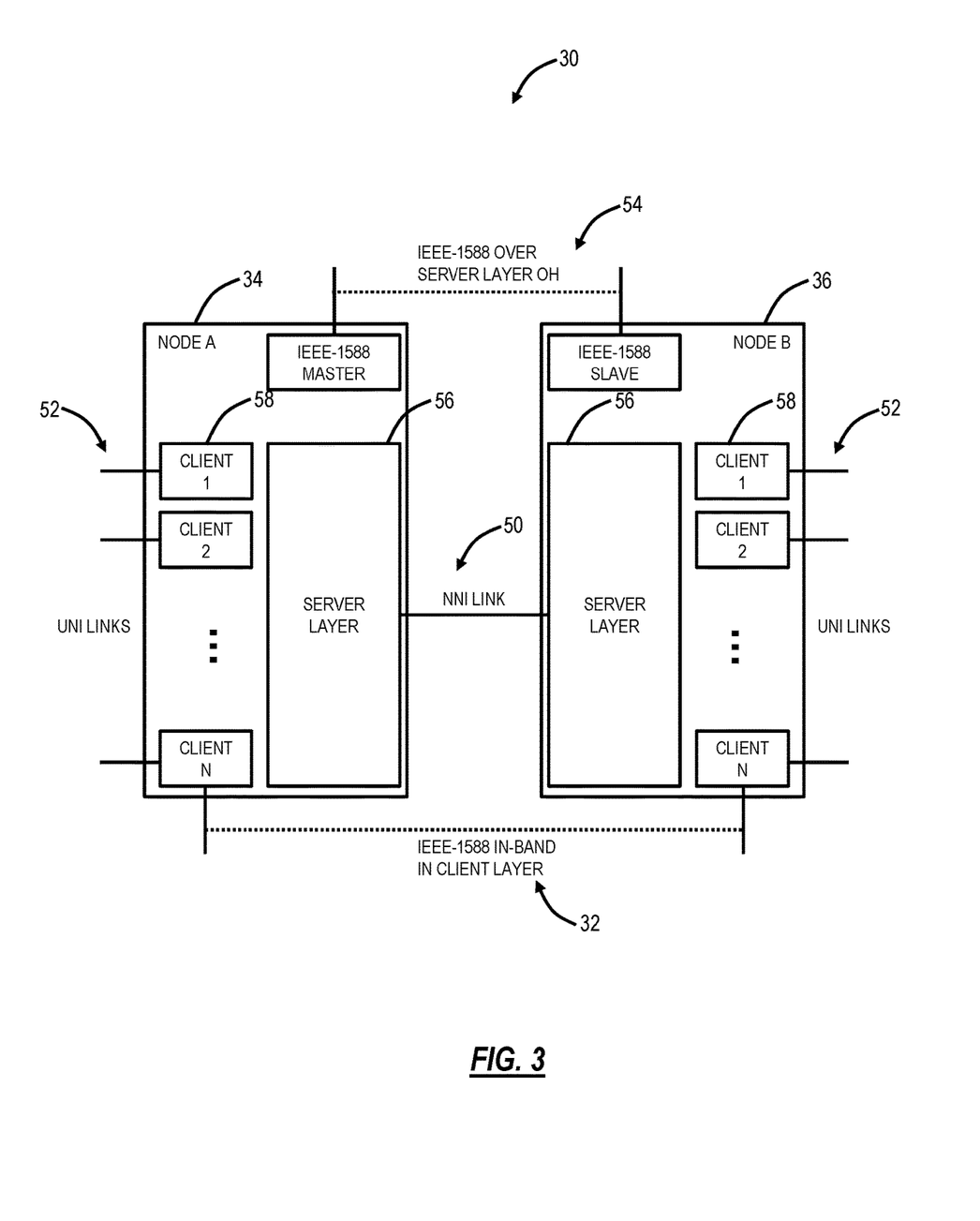
FIG. 3 is a block diagram of the network elements in the network of FIG. 2 and associated functionality implementing the distributed TC.

FIG. 3 is a block diagram of the network elements 34, 36, and associated functionality implementing the distributed TC. The network elements 34, 36 can be referred to as nodes A, B to denote these may also be other aspects in the network 30, such as modules rather than network elements. The network 30 includes one or more Network-Network Interface (NNI) links 50 which interconnect the nodes A, B at the server layer. The network 30 also includes User-Network Interface (UNI) links 52 which interconnect the nodes A, B to the switches 38, 40, respectively (the switches 38, 40 are not shown in FIG. 3).

There can be a PTP instance 54 operating over the server layer, such as in server layer overhead (OH). In this manner, the nodes A, B are synchronized with one another. For example, the node A is an IEEE 1588 master whereas the node B is an IEEE 1588 slave. Again, other synchronization techniques are also contemplated. The key here is the nodes A, B have clocks synchronized to one another.

The nodes A, B include server layer components 56 that are configured to interface data between the nodes A, B via the NNI link 50. The server layer components 56 can include electrical circuitry, wireless components, and/or optical components, as are known in the art to enable communication over OTN, Dense Wave Division Multiplexing (DWDM), wireless, FlexE, etc. The server layer components 56 can be configured to implement synchronization between the nodes A, B such as via server layer OH.

The nodes A, B also include client layer components 58 that are configured to interface data between the switches 38, 40 over the UNI links 52 and the server layer components 56. Similarly, the client layer components 58 can include electrical circuitry, wireless components, and/or optical components, as are known in the art, to enable communication with the switches 38, 40 over the UNI links. The client layer components 58 are configured to implement the distributed transparent clock 32 where the timestamps are used from the nodes A, B in the correction field of PTP packets 42, 44.

By synchronizing the server layer, such as via the PTP instance 54, independently of the client layer allows the client layer to operate as the distributed transparent clock 32. Operating the client layer as a transparent clock has the advantage that the IEEE 1588 protocol does not need to be terminated, in the server layer. Instead, IEEE 1588 packets 42, 44 are modified inline to apply a correction for the residence time in the network between the ingress client interface and the egress client interface.

In addition, because the transport network synchronization runs independently of the client layer synchronization, it allows multiple clock domains at the client layer. That is, a transport network operator can carry multiple client signals with timing domains that are independent of each other and independent of the timing domain of the transport network 5. This allows operators to manage their packet and transport networks separately.

Residence Time in the Distributed Transparent Clock

Again, the nodes A, B (e.g., the network elements 34, 36) are synchronized to one another. The distributed transparent clock 32 corrects for the residence time in the network 5, between the client interfaces A, B, or the client layer components 58, via the correction field in the PTP packets 42, 44. That is, the correction field in the PTP packets 42, 44 is not merely updated for residence time in a single switch, but rather for the residence time in the network 5, between the client interfaces A, B or the client layer components 58.

The network residence time for the client PTP packets 42, 44 may be computed by various techniques.

In an embodiment, the ingress node A may update the correction field of the PTP packets 42, 44, by subtracting the current time, followed by the egress node B adjusting the correction field by adding the current time. What is left in the correction field is equal to the value at the ingress client interface plus the residence time between the ingress client interface and egress client interface.

In another embodiment, the ingress node A may mark the packet arrival time in a reserved field, followed by the egress node B updating the correction field by adding the difference between the current time and time in the reserved field.

In a further embodiment, the ingress node A may append a Type-Length-Value (TLV) in the packet 42, 44, which indicates the arrival time, followed the egress node B updating the correction field by adding the difference between the current time and the time in the TLV.

Other embodiments are also contemplated.

Example Network Element/Node

Figure 4:
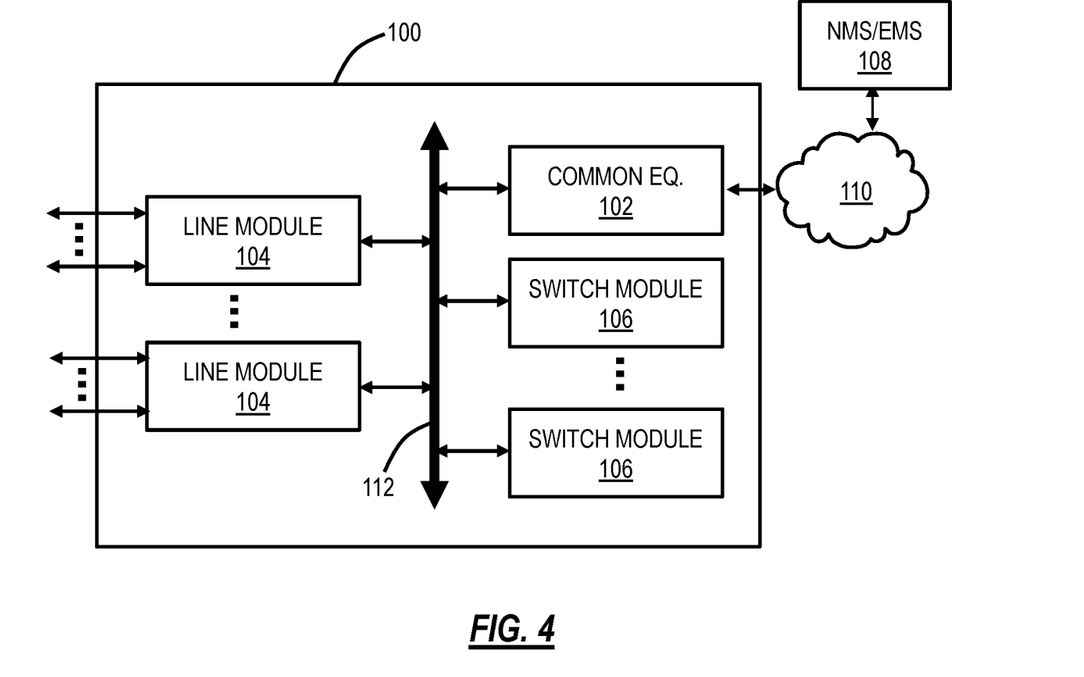
FIG. 4 is a block diagram of an example network element (node) for use with the systems and methods described herein.

FIG. 4 is a block diagram of an example network element 100 (node) for use with the systems and methods described herein. In an embodiment, the network element 100 can be a device that may consolidate the functionality of an Internet Router, a Multiprotocol Label Switching (MPLS) router or switch, a Multi-Service Provisioning Platform (MSPP), Digital Cross-Connect (DCS), Ethernet and/or Optical Transport Network (OTN) switch, Wave Division Multiplexed (WDM)/DWDM platform, Packet Optical Transport System (POTS), etc. into a single, high-capacity intelligent switching system providing Layer 0, 1, 2, and/or 3 consolidation. In another embodiment, the network element 100 can be any of an OTN Add/Drop Multiplexer (ADM), a Multi-Service Provisioning Platform (MSPP), a Digital Cross-Connect (DCS), an optical cross-connect, a POTS, an optical switch, a router, a switch, a WDM/DWDM terminal, an access/aggregation device, a wireless base station, etc. That is, the network element 100 can be any digital, wireless (Radio Frequency (RF)), and/or optical system with ingress and egress digital, wireless, and/or optical signals, including switching of channels, timeslots, tributary units, wavelengths, etc. Also, the network element 100 may be a physical device as well as a virtual device (e.g., Virtual Network Function (VNF)).

In an embodiment, the network element 100 includes common equipment 102, one or more line modules 104, and one or more switch modules 106. The common equipment 102 can include power; a control module; Operations, Administration, Maintenance, and Provisioning (OAM&P) access; user interface ports; and the like. The common equipment 102 can connect to a management system 108 through a data communication network 110. Those of ordinary skill in the art will recognize the network element 100 can communicate with other network elements 100, with other devices, such as, without limitation, a Software-Defined Networking (SDN) controller, an orchestrator, a Network Management System (NMS), and Element Management System (EMS), etc.

Figure 5:
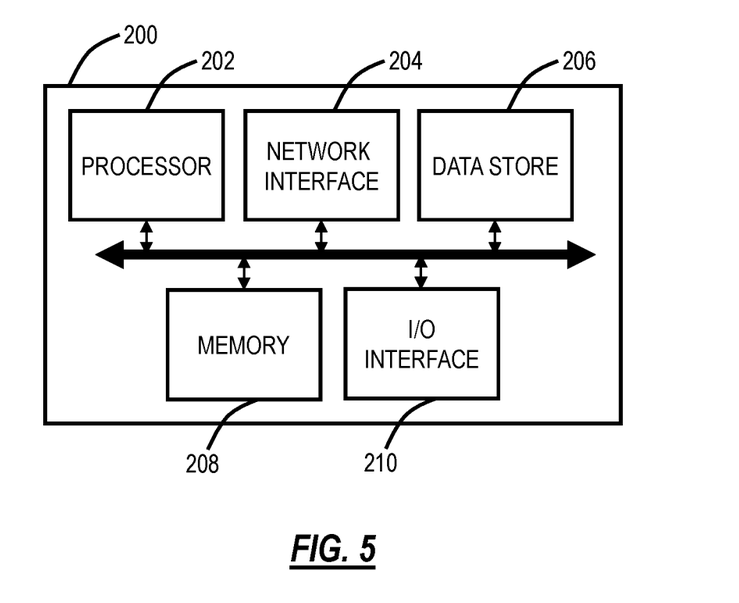

Additionally, the common equipment 102 can include a controller, such as a controller 200 illustrated in FIG. 5 configured to perform OAM&P functions, operate a control plane, etc. The network element 100 can include an interface 112 for communicatively coupling the common equipment 102, the line modules 104, and the switch modules 106 to one another. For example, the interface 112 can be a backplane, midplane, a bus, optical and/or electrical connectors, or the like. The line modules 104 are configured to provide ingress and egress to the switch modules 106 and to external connections on the links to/from the network element 100. In an embodiment, the line modules 104 can form ingress and egress switches with the switch modules 106 as center stage switches for a three-stage switch, e.g., a three-stage Clos switch. Other configurations and/or architectures are also contemplated.

Further, the line modules 104 can include a plurality of optical connections per module, and each module may include flexible rate support for any type of connection. The line modules 104 can include WDM interfaces, short-reach interfaces, Digital Coherent Optics (DCO), and the like, and can connect to other line modules 104 on remote network elements, end clients, edge routers, and the like, e.g., forming connections on the links in a network. From a logical perspective, the line modules 104 provide ingress and egress ports to the network element 12, and each line module 104 can include one or more physical ports. The switch modules 106 are configured to switch channels, timeslots, tributary units, packets, etc. between the line modules 104. For example, the switch modules 106 can provide wavelength granularity (Layer 0 switching); OTN granularity; Ethernet granularity; and the like. Specifically, the switch modules 106 can include Time Division Multiplexed (TDM) (i.e., circuit switching) and/or packet switching engines. The switch modules 106 can include redundancy as well, such as 1:1, 1:N, etc.

Those of ordinary skill in the art will recognize the network element 100 can include other components which are omitted for illustration purposes, and that the systems and methods described herein are contemplated for use with a plurality of different network elements with the network element 100 presented as an example type of network element. For example, in another embodiment, the network element 100 may not include the switch modules 106, but rather have the corresponding functionality in the line modules 104 (or some equivalent) in a distributed fashion. Also, the network element 100 may omit the switch modules 106 and that functionality, such as in a Dense Wave Division Multiplexing (DWDM) terminal. Further, in another embodiment, the network element 100 may omit modules altogether and be physically formed in an integrated chassis, such as a so-called "pizza box." Even further, the network element 100 may include pluggable modules as well.

In general, the systems and methods described herein contemplate use with any network element, and the network element 100 is merely presented as an example for the systems and methods described herein.

Example Controller

FIG. 5 is a block diagram of a processing device 200, which can form a controller for the network element 100, or the like. The processing device 200 can be part of the common equipment, such as common equipment 102 in the network element 100, or a stand-alone device communicatively coupled to the network element 100 via the data communication network 110. In a stand-alone configuration, the processing device 200 can be the management system 108, etc. Also, the processing device 200 can be a virtual device such as a Virtual Machine (VM) or an application on a VM, a software container, etc. The processing device 200 can include a processor 202 which is a hardware device for executing software instructions such as operating the control plane. The processor 202 can be any custom made or commercially available processor, a central processing unit (CPU), an auxiliary processor among several processors associated with the controller 200, a semiconductor-based microprocessor (in the form of a microchip or chipset), or generally any device for executing software instructions. When the processing device 200 is in operation, the processor 202 is configured to execute software stored within the memory, to communicate data to and from the memory, and to generally control operations of the processing device 200 pursuant to the software instructions. The processing device 200 can also include a network interface 204, a data store 206, memory 208, an I/O interface 210, and the like, all of which are communicatively coupled to one another and to the processor 202.

The network interface 204 can be used to enable the processing device 200 to communicate on the data communication network 110, to the management system 108, to the network elements 100, and the like. The network interface 204 can include, for example, an Ethernet module. The network interface 204 can include address, control, and/or data connections to enable appropriate communications on the network. The data store 206 can be used to store data, such as control plane information, provisioning data, OAM&P data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the controller 200 to communicate with other devices. Further, the I/O interface 210 includes components for the processing device 200 to communicate with the other network elements 100, such as using overhead or the like.

The processing device 200 is configured to implement software, processes, algorithms, etc. that can control configurable features of a network, such as automating discovery of the network elements 100, capacity on the links, port availability on the network elements 100, connectivity between ports; dissemination of topology and bandwidth information between the network elements 100; path computation and creation for connections; network-level protection and restoration; monitor operational status of the network elements 100; and the like.

Distributed Transparent Clock Process

Figure 6:
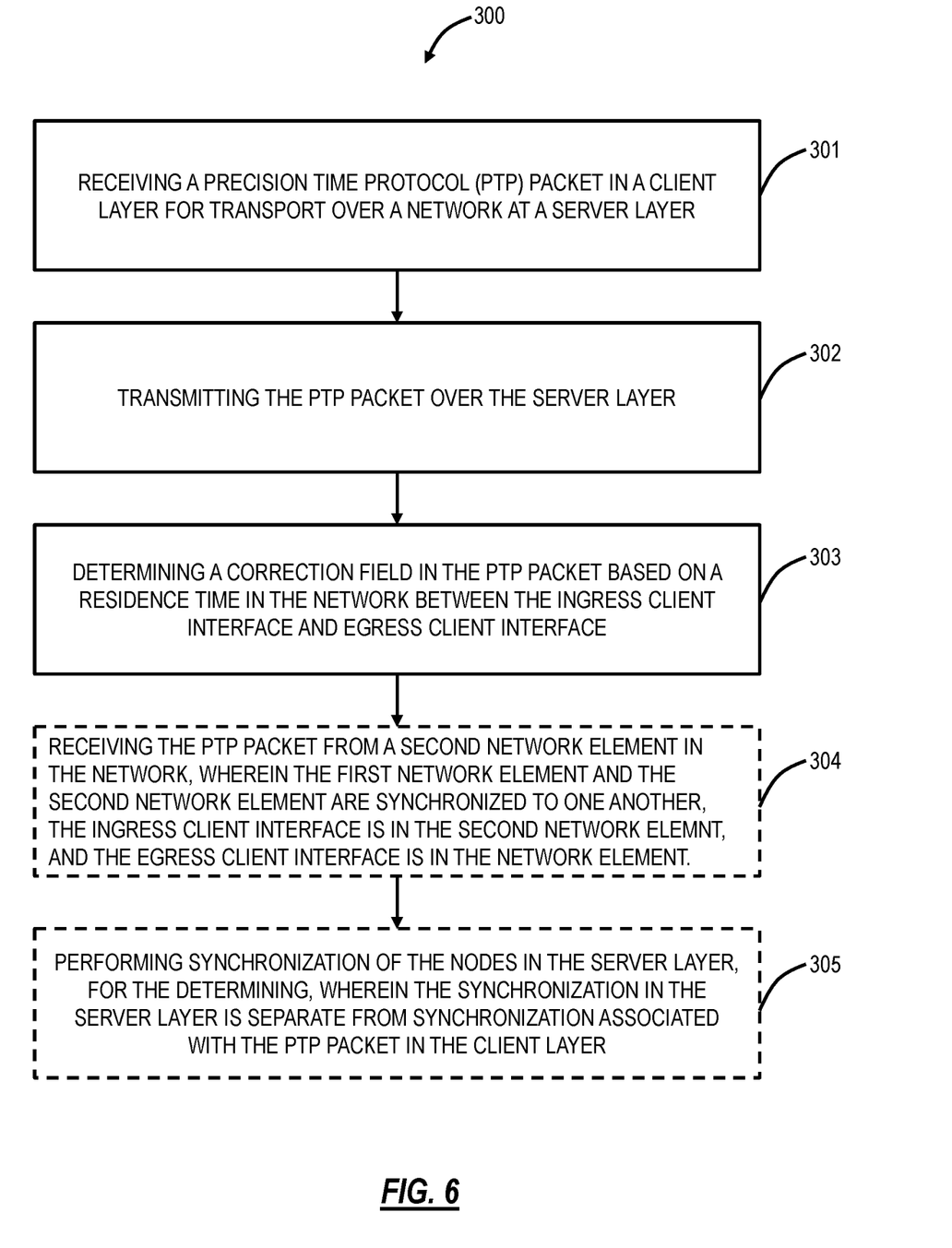
FIG. 6 is a flowchart of a distributed transparent clock process.

FIG. 6 is a flowchart of a distributed transparent clock process 300. Of note, the distributed transparent clock process 300 is implemented by a single network element, such as one of the network elements 34, 36, 100. The distributed transparent clock process 300 includes receiving a Precision Time Protocol (PTP) packet in a client layer for transport over a network at a server layer (step 301); transmitting the PTP packet over the server layer (step 302); and determining a correction field in the PTP packet based on a residence time between an ingress client interface and an egress client interface (step 303). That is, the residence time is the time between the client level components 58 in the network 30.

The receiving step 301 can be at a first network element in the network, and the distributed transparent clock process 300 can further include receiving the PTP packet from a second network element in the network, wherein the first network element and the second network element are synchronized to one another, the ingress client interface is in the second network elemnt, and the egress client interface is in the network element (step 304). The distributed transparent clock process 300 can further include performing synchronization of the nodes in the server layer, for the determining, wherein the synchronization in the server layer is separate from synchronization associated with the PTP packet in the client layer (step 305).

The residence time in the network includes the time for a PTP packet to transit between two different network elements and across the network at the server layer. That is, the time between the arrival time of a PTP packet at the client interface of one network element and the departure time of the PTP packet from the client interface at a different network element. The determining step 303 can include an ingress node in the network subtracting a first time from the correction field, followed by an egress node in the network adding a second time the correction field, where the first time is a current time at the ingress node when the packet was received at the client interface and the second time is a current time at the egress node when transmitting the packet from the client layer.

The determining step 303 can include an ingress node marking an arrival time at the receiving in a reserved field of the PTP packet, followed by an egress node updating the correction field by adding a difference between a current time and the arrival time in the reserved field. The determining step 303 can include an ingress node appending a Type-Length-Value (TLV) to the PTP packet which indicates an arrival time, followed an egress node updating the correction field by adding a difference between a current time and the arrival time in the TLV.

In another embodiment, a distributed transparent clock apparatus, in a first node in a network, includes client layer components configured to interface a device that operates at a client layer; and server layer components configured to connect to a network that operates at a server layer, wherein the server layer components are configured to implement a synchronization instance with a second node in the network, and wherein the client layer components are configured to implement a distributed transparent clock on a Precision Time Protocol (PTP) packet at the client layer, the distributed transparent clock includes a correction field in the PTP packet based on a residence time in the network at the server layer In a further embodiment, a transport network includes a first node connected to a first client device; and a second node connected to a second client device via one or more network links over a server layer, wherein the first client device communicates to the second client device via a client layer, wherein the first node and the second node are synchronized to one another, and wherein the first node and the second node are configured to implement a distributed transparent clock on a Precision Time Protocol (PTP) packet at the client layer, the distributed transparent clock includes a correction field in the PTP packet based on a residence time in the transport network at the server layer It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A distributed transparent clock method comprising:
in a network element comprising an egress node, receiving a Precision Time Protocol (PTP) packet from an ingress node that sent the PTP packet over a network;
determining a value for a correction field in the PTP packet based on a residence time in the network, wherein the residence time is based on time spent between an ingress client interface and an egress client interface, wherein there is a distributed transparent clock between the ingress client interface and the egress client interface on a different network element;
performing synchronization of nodes in a server layer, for the determining, wherein the synchronization in the server layer is separate from synchronization associated with the PTP packet in the client layer; and
transmitting the PTP packet in a client layer with the value in the correction field.

2. The distributed transparent clock method of claim 1, wherein the egress node and the ingress node are synchronized to one another, the ingress client interface is in the ingress node, and the egress client interface is in the egress node.

3. The distributed transparent clock method of claim 1, wherein the residence time in the network includes elapsed time between an arrival time of a PTP packet at the ingress client interface of the ingress node and a departure time of the PTP packet from the egress client interface at the egress node.

4. The distributed transparent clock method of claim 1, wherein the determining includes the ingress node subtracting a first time in the correction field, followed by the egress node adding a second time in the correction field, where the first time is a current time at the ingress node when the PTP packet is received at the ingress node and the second time is a current time at the egress node when transmitting over the client layer.

5. The distributed transparent clock method of claim 1, wherein the determining includes the egress node updating the correction field by adding a difference between a current time at the egress node and an arrival time in a reserved field.

6. The distributed transparent clock method of claim 1, wherein the determining includes the egress node updating the correction field by adding a difference between a current time at the egress node and an arrival time in a Type-Length-Value (TLV).

7. A distributed transparent clock apparatus, in a first node in a network, comprising:
client layer components configured to interface a device that operates at a client layer; and
server layer components configured to connect to a network that operates at a server layer,
wherein the server layer components are configured to implement a synchronization instance with a second node in the network,
wherein the client layer components are configured to implement a distributed transparent clock on a Precision Time Protocol (PTP) packet at the client layer, the distributed transparent clock includes a correction field in the PTP packet that is used to determine a residence time in the network between an ingress client interface and an egress client interface, wherein the distributed transparent clock is between the first node and a different network element, and
wherein the synchronization instance in the server layer is separate from synchronization associated with the PTP packet in the client layer.

8. The distributed transparent clock apparatus of claim 7, wherein the correction field is updated based on the synchronization instance with the second node.

9. The distributed transparent clock apparatus of claim 7, wherein the residence time in the network includes elapsed time between an arrival time of a PTP packet at the ingress client interface of the first node and a departure time of the PTP packet from the egress client interface at the second node.

10. The distributed transparent clock apparatus of claim 7, wherein the correction field is set by the first node subtracting a first time in the correction field, followed by the second node adding a second time in the correction field, where the first time is a current time at the first node when the PTP packet is received and the second time is a current time at the second node when transmitted over the client layer.

11. The distributed transparent clock apparatus of claim 7, wherein the correction field is set by the first node marking an arrival time in a reserved field of the PTP packet, followed by the second node updating the correction field by adding a difference between a current time and the arrival time in the reserved field.

12. The distributed transparent clock apparatus of claim 7, wherein the correction field is set by the first node appending a Type-Length-Value (TLV) to the PTP packet which indicates an arrival time, followed the second node updating the correction field by adding a difference between a current time and the arrival time in the TLV.

13. A method to perform a client Precision Time Protocol (PTP) instance in a client layer comprising
determining an arrival timestamp of a client PTP packet at an ingress of a Transparent Clock domain and including the arrival timestamp in the PTP packet;
determining a departure timestamp of the client PTP packet at an egress of the Transparent Clock domain;
utilizing the arrival timestamp and the departure timestamp to determine a residence time of the client PTP packet in the Transparent Clock domain; and
including an adjustment value based on the residence time in the client PTP packet at the egress,
wherein the client PTP instance is implemented over a separate and independent server PTP timing instance where nodes at the ingress and egress of the transparent clock domain are separately synchronized with one another.

14. The method of claim 13, wherein the adjustment value includes adding the residence time to a correction field of the client PTP packet.

15. The method of claim 13, wherein the arrival timestamp is included in a field in the client PTP packet.

16. The method of claim 13, wherein the utilizing includes subtracting the arrival timestamp from the departure timestamp to determine the residence time.

17. The method of claim 13, wherein the ingress and the egress are synchronized with one another via Time of Day.

18. The method of claim 13, wherein the Transparent Clock domain is a FlexE PTP domain.

19. The distributed transparent clock method of claim 1, wherein the synchronization of nodes in the server layer is performed by a PTP instance that is separate from a PTP instance associated with the distributed transparent clock.

20. The distributed transparent clock apparatus of claim 7, wherein the synchronization instance in the server layer is performed by a PTP instance that is separate from a PTP instance associated with the distributed transparent clock.

\* \* \* \* \*